United States Patent [19]

Hunter

[11] Patent Number: 5,008,359

[45] Date of Patent: Apr. 16, 1991

[54] ISOCYANATE MODIFIED CELLULOSE PRODUCTS AND METHOD FOR THEIR MANUFACTURE

[75] Inventor: Frank R. Hunter, Bellevue, Wash.

[73] Assignee: Weyerhaeuser Company, Tacoma, Wash.

[21] Appl. No.: 275,824

[22] Filed: Nov. 25, 1988

[51] Int. Cl.$^5$ .................. C08H 5/04; C08G 18/00; B32B 21/06; B32B 23/04

[52] U.S. Cl. .................. 527/103; 527/301; 428/534; 428/535; 428/536; 428/537.1

[58] Field of Search .............. 525/54.22; 527/301, 527/401, 103; 428/534, 535, 536, 537.1

[56] References Cited

U.S. PATENT DOCUMENTS

| | | | |
|---|---|---|---|
| 2,339,913 | 1/1944 | Hanford et al. | 222/332 |
| 2,430,479 | 11/1945 | Pratt et al. | 154/140 |
| 2,597,025 | 5/1952 | Orth | 528/52 |
| 3,007,763 | 11/1961 | Adams | 8/192 |
| 3,666,593 | 5/1972 | Lee | 156/285 |
| 4,032,483 | 6/1977 | Hartman | 527/301 |
| 4,525,321 | 6/1985 | Tonniges | 264/517 |
| 4,609,513 | 9/1986 | Israel | 264/122 |

FOREIGN PATENT DOCUMENTS

| | | |
|---|---|---|
| 225342 | 3/1986 | Japan . |
| 1148016 | 3/1967 | United Kingdom . |
| 1502979 | 9/1975 | United Kingdom . |
| 2075038 | 11/1981 | United Kingdom ............ 527/401 |
| 2112791 | 12/1981 | United Kingdom . |

OTHER PUBLICATIONS

Hajime Yamashina, Fumito Nakamura, Kazuo Sakai, Yutaka Satoh, Kazuhide Minato: "Strengthening Paper Pipes With Aromatic Isocyanate Compounds", J. Hokkaido For. Prod. Res. Inst., vol. 2, No. 3, pp. 28–32 (1988).

*Primary Examiner*—Nathan M. Nutter

[57] ABSTRACT

The invention is a method of making a cellulose based polymeric material and the products of the invention. A cellulosic substrate is impregnated with an essentially uncatalyzed polyfunctinal isocyanate and pressed at elevated temperature and pressure. The substrate may be a chemical or thermomechanical pulp or paper while the isocyanate is preferably diphenylmethane diisocyanate or its oligomers. Pressing conditions are preferably in the range of about 150°–245° C. at pressures in the range of about 2700–8300 kPa for times less than 2 minutes. Moisture content of the cellulosic substrate is not highly critical and may be as high as 7% without adverse effects. The product is especially useful as overlays and for forming strong, water resistant laminates which can be molded in either flat or three dimensional forms.

29 Claims, 2 Drawing Sheets

ISOCYANATE MODIFIED CELLULOSE PRODUCTS AND METHOD FOR THEIR MANUFACTURE

BACKGROUND OF THE INVENTION

This invention relates generally to the manufacture of a cellulose based polymeric material. More particularly it relates to a modified cellulose product manufactured by impregnating a cellulosic material with an essentially uncatalyzed polyisocyanate and then curing the impregnated material at predetermined temperatures and pressures. Resulting from the manufacturing method are relatively rigid hydrophobic sheets that can be used in flat sheet form or molded into three dimensional products. In another embodiment multiple plies of uncured impregnated cellulosic material can be laminated together during the curing process. The cellulosic raw material can be in any form such as chemical wood pulps, linerboard, paper products and the like as long as it is receptive to being impregnated with an appropriate form and amount of polyisocyanate.

Polyisocyanates have had wide study as adhesives and binders for composite wood products such as hardboard and particleboard. These products have failed to find significant acceptance in the industry for various reasons.

Yamashina et al, *J. Hokkaido For. Prod. Res. Inst.* (Japan), 2(3):28-32 (1988) teach impregnation of rolled paper cores with catalyzed aromatic isocyanates for improving strength. These products are used; e.g., as cores for rolls of pulp or paper. Experimental details are scanty but one table compares results using three different catalysts with a control run apparently made without any catalyst.

Others have impregnated cellulosic materials with isocyanates and then cured the composite at elevated temperatures and pressures. For example, British Pat. No. 1,585,074 describes treatment of cellulosic materials, such as groundwood and kraft pulps, with solutions of blocked or capped isocyanates and a catalyst to produce moldable products having improved strength. The chemistry of the system must be selected so that the solvent used for applying the material will evaporate well below the dissociation temperature of the blocked isocyanate. Apparently one reason for the choice of a blocked isocyanate was to overcome problems of reaction with residual moisture that might be present in the fiber. This patent gives a good historical background of isocyanate-cellulose reaction products.

Published U.K. patent application No. 2,112,791 discloses a similar process but teaches that certain conditions must be met and, importantly, that a catalyst is essential. The moisture content is also apparently a critical condition as the disclosure states it should not exceed 5% and most preferably should not be more than 1 or 2% by weight. Conditions stated in the British specification are relatively high pressures, in the range of 900-1600 psi (6,200-11,000 kPa), and relatively long cure times of about 10 minutes when there is 10% by weight isocyanate in the cellulosic material.

As noted, a catalyst is stated as being an essential feature of the British process. In its absence hot pressing of the impregnated cellulose was stated to result in little or no polyurethane formation, due to the unreactive nature of the hydroxyl groups on cellulose. However, the use of catalyst at elevated temperature facilitates this reaction. The inventor notes the possible health hazard of using the blocked isocyanates described in his earlier noted British patent, and comments further on other disadvantages.

The present process represents a significant improvement over that taught in the above-noted British patent. It enables production of products at much shorter cure times, up to a full order of magnitude, and at lower pressures. Moisture content of the cellulosic sheets can be higher than that generally accepted in the British process. Storage life of the impregnated product is acceptable and physical properties of the ultimate products are superior.

SUMMARY OF THE INVENTION

Figure 1:
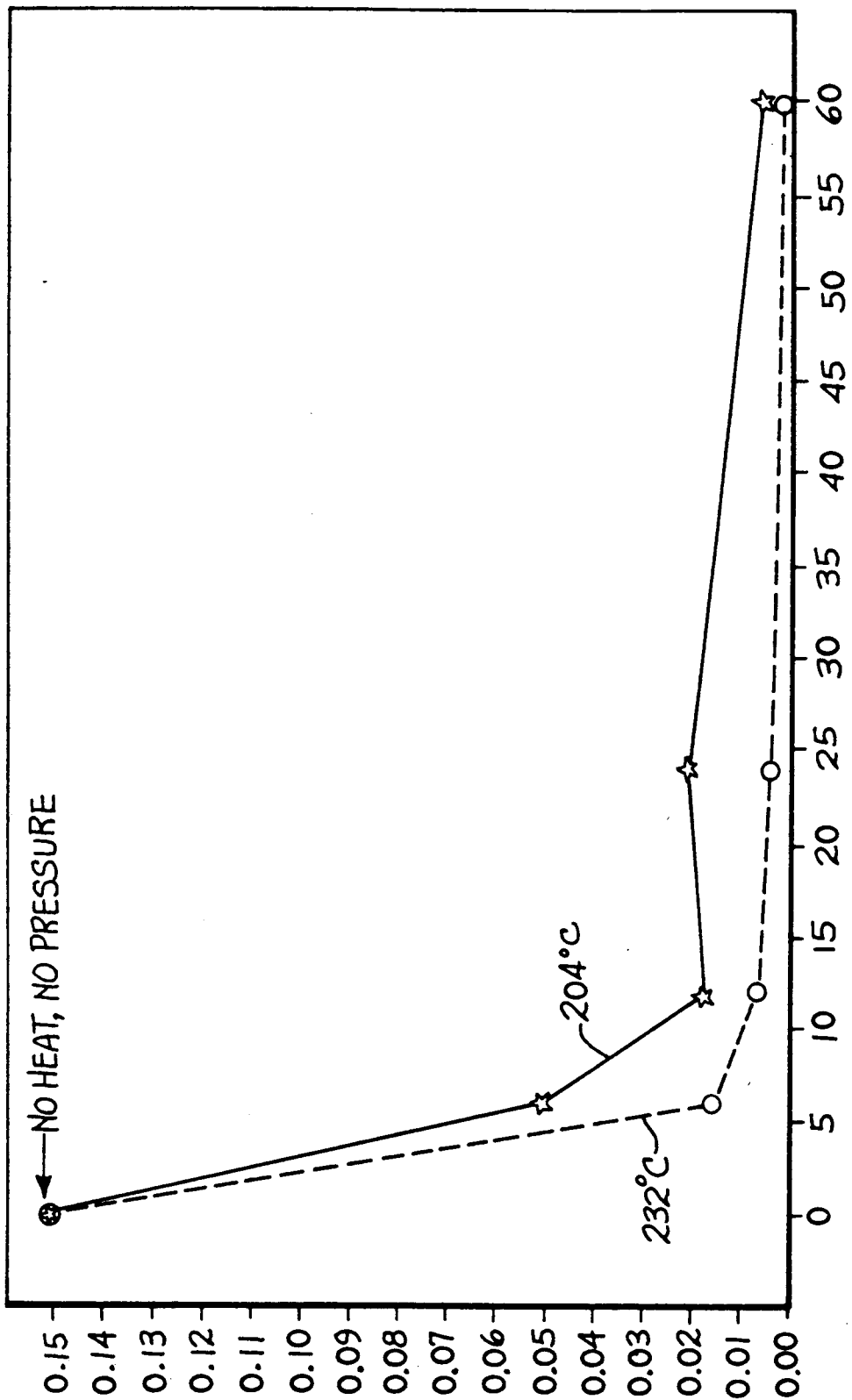
FIG. 1 is a graph illustrating infrared absorbance to show reaction results.

This invention is practiced in one form as a method of making a modified cellulose based product in which the cellulosic material is impregnated with an essentially uncatalyzed polyisocyanate which is then heated to a temperature in the range of about 105°-245° C. for a time not exceeding about 5 minutes and at a pressure of at least about 900 kPa. Preferred temperatures are about 150° C. or greater with pressures of about 3,000 kPa or greater and times in the range of about 1-2 minutes. While it is preferred that no catalyst at all should be used, very small quantities are not generally detrimental. By "essentially uncatalyzed" is meant no more than 0.05% of any of the various catalysts normally used to promote reaction of an isocyanate to a urethane compound. Surprisingly, it has been found that active catalysts tend to cause poor adhesion between laminates made using impregnated sheets of the product. The resulting physical properties of the ultimate product are poor and frequently unacceptable. It has also been discovered that required pressing times of resins without catalysts are as short as or even very significantly shorter than with equivalent catalyzed resins.

While moisture content of the cellulose is not highly critical, it should preferably be no greater than about 7%.

The invention is also considered to include the products manufactured by the method.

Accordingly, one object of the present invention is to manufacture relatively rigid, strong, hydrophobic cellulose based materials.

Another object is to manufacture the cellulose based materials utilizing essentially uncatalyzed polyisocyanates.

Yet a further object of the invention is the utilization of uncatalyzed polyisocyanates with the cellulosic material to yield impregnated matrices which can then be cured in a continous manner.

Still another object is to produce the impregnated matrices and then laminate at least one such layer to a compatible substrate such as a wood veneer while curing occurs.

These and many other objects and advantages of the present invention will become apparent upon reading of the specification to follow in conjunction with the drawings.

DETAILED DESCRIPTION OF THE INVENTION

Almost any cellulose based material is a suitable starting raw material for this invention. Examples are cellulosic fiber material such as bleached or unbleached kraft linerboard, paper products, chemical or thermomechanical pulp sheets or mats and the like. As long as the cellulosic material is sufficiently porous to take up a quantity of polyisocyanate it may be utilized. The cellulosic fiber should be a type and form which can be wet formed into a cohesive sheet or mat.

The isocyanate form essential to this invention is a polyisocyanate; i.e., one having at least two isocyanate groups. As one preferred group of compounds diphenylmethane diisocyanate and its oligomers are utilized, although other similar compounds will be equally usable. These include all of the available di- and polyisocyanate materials such as toluene diisocyanate, and 1,6-hexamethylene diisocyanate. The term "polyisocyanate" should be construed to include those compounds having two or more available —NCO functional groups. The polyisocyanates may also be used in blocked form; i.e., having attached heat labile substituent groups that inhibit reaction below some specified temperature.

It has been found that the polyisocyanate may be impregnated into the cellulosic material in either neat form or in solution with a solvent such as acetone. The desired weight addition to the cellulosic material is in a range of from about 5–50% depending upon the desired end properties in the cured material. In manufacturing useful products that are relatively rigid, strong and water repellant, a desirable weight range for the polyisocyanate is from about 8–20% where excellent end use properties are obtained at a reasonable manufacturing cost.

Impregnating the cellulosic material in neat form can be done by simply passing the cellulosic material through a roll coater to achieve the desired polyisocyanate pickup. In solution form the polyisocyanate in, for example, acetone is placed in a bath and the cellulosic material is passed through the bath allowing the material to become impregnated with the solution. Thereafter the solvent evaporates leaving the polyisocyanate. Preferably no catalyst is present during the impregnation step. However, small quantities of catalyst, up to a level of 0.05% by weight of the polyisocyanate, are generally permissible without producing adverse effects.

After impregnation, the cellulose-polyisocyanate matrix is cured during a pressing cycle under controlled conditions of time, temperature and pressure. If desired, the impregnated material can be stored for a suitable period of time prior to the curing step. Storage times of at least several days at room temperature are generally permissible. The curing step is carried out in a typical hot press at a temperature in the range of from about 105°–245° C. for a time not exceeding about 5 minutes and at a pressure of at least about 900 kPa. Preferably the pressure is in a range of from 2700–8300 kPa (392–1204 psi).

While a single impregnated sheet of cellulosic material can be hot pressed to cure the polyisocyanate, multiple sheets of the impregnated material can be laminated to each other or to layers of compatible unimpregnated materials such as wood veneer or reconstituted wood composites like hardboard. Examples that follow illustrate products that may be produced in laminated form and show the conditions of their preparation.

EXAMPLE 1

Kraft linerboard sheets at 5–7% moisture content were impregnated with uncatalyzed poly[diphenylmethane diisocyanate] (PMDI) using one of two methods. The PMDI is available from Dow Chemical Co., Midland, Mich. as PAPI-2027. In the first method, the PMDI was dissolved in a solvent, such as acetone, and the linerboard dipped in the resulting solution until saturated. The saturated sheets were then hung for a sufficient time to allow the solvent to evaporate. The other method used was roll coater impregnation. Here the linerboard is passed through a bead or puddle of undiluted liquid PMDI lying in the nip zone of two press rolls. The bead may be on only one side or on both sides of the sheet as it is passed between the rolls.

In the first method the amount impregnated is controlled by the concentration of the PMDI in the solution. In the second method pickup is controlled primarily by roll pressure and clearance.

Kraft linerboard sheets of 58 lb basis weight (58 lb/1000 ft$^2$ or 283 g/m$^2$) were saturated with a 13% solution of PMDI in acetone. After evaporation of the solvent the sheets showed a pickup of 12–14% PMDI. Identical linerboard sheets were also treated in a roll coater to achieve similar pickup. In one instance all of the coating was applied to the wire side of the sheet. A second sample was similarly coated on the felt side of the sheets. Third samples were made with the coating evenly distributed on both sides of the sheets.

In order to investigate distribution of the PMDI within the Z or thickness dimension of the sheets, the impregnated sheets were cured by oven heating at 177° C. (350° F.) for 3–4 hours without external pressure. After cooling, the sheets were sectioned into the top, center and lower thirds of sheet thickness. These portions were analyzed for nitrogen content by the Kjeldahl method as a measure of the amount of PMDI in each layer. Results are shown in Table 1.

TABLE 1

|  | Solvent | Roll Coater Impregnation | | |
| --- | --- | --- | --- | --- |
|  |  | Wire Side | Felt Side | Both Sides |
| Felt side, % N | 0.65 | 0.08 | 2.00 | 1.06 |
| Center, % N | 0.78 | 0.92 | 0.90 | 0.58 |
| Wire side, % N | 0.83 | 2.21 | 0.16 | 1.08 |

It is apparent under the conditions of the above tests that solvent impregnation produces the most uniform distribution of PMDI within the sheets. This is followed by two-sided roll coater application. There is a very marked one sidedness to sheets coated on a single side. Presumably other types of coaters would produce somewhat different results.

The above noted polyisocyanate distribution phenomenon can be used to great advantage when designing ultimate products using the impregnated sheets. Higher surface concentrations promote strong interply bonding while more uniform distribution tends to give greater isotropy in Z direction strength.

EXAMPLE 2

Kraft linerboard of 283 g/m$^2$ basis weight was roll coated on both sides with uncatalyzed PMDI, as described in Example 1. Loading was in the range of 13-16% PMDI based on oven dry weight. Two thusly impregnated sheets were used as face plies, one on either side, to form laminated wood composite products using reconstituted wood fiber core materials. One core material was "Macosa" hardboard, a Mexican product about 2.5 mm thick. The other was PresTock fiber mats. PresTock is a registered trademark of Weyerhaeuser Company, Tacoma, Washington for a moldable wood fiber mat treated with both thermoplastic rosin-like resins and thermosetting resins. Basis weight of the PresTock fiber mats was chosen to give molded panels about 2.5 mm thick.

The impregnated sheets were used as face plies with the wood fiber cores without the use of any additional adhesive. Panels were pressed at 240° C. using the following schedules: for "Macosa" core—12 sec. closing to 1,380 kPa (200 psi), 6 sec. to 0 kPa, 6 sec. closing to 5,520 kPa (800 psi), 18 sec. at 5,520 kPa, 12 sec. to 0 kPa, 6 sec. at 0 kPa, and open press; for PresTock core—12 sec closing to 3,450 kPa (500 psi), 6 sec. to 0 kPa, 6 sec. at 0 kPa, 6 sec. closing to 3,450 kPa, 18 sec. at 3,450 kPa, 12 sec. to 0 kPa, 6 sec. at 0 kPa, and open press.

After conditioning, the panels were tested for tensile and flexural strength and modulus of elasticity in flexure. Test results are given in Table 2.

TABLE 2

|  | Tensile Strength, $\times 10^4$ kPa | Flexural Strength, $\times 10^4$ kPa | Flexural Modulus, $\times 10^6$ kPa |
| --- | --- | --- | --- |
| Macosa control | 3.1 | 5.9 | 4.2 |
| Macosa sandwich | 6.5 | 12.8 | 10.2 |
| PresTock control | 3.2 | 6.0 | 6.6 |
| PresTock sandwich | 5.8 | 10.7 | 9.2 |

Significantly improved physical properties result when the fiberboard panels are overlaid sandwich fashion between PMDI treated sheets of kraft linerboard.

It was observed that the overlaid fiberboard panels were much more water resistant than the base panels. A modified Cobb ring test was used to measure the water resistance of PresTock fiber panels overlaid on one face with PMDI impregnated 283 g/m² kraft linerboard. In this particular case, the linerboard was treated to about 12-13% PMDI pickup from an acetone solution of the isocyanate. The Cobb ring test consists of clamping a Cobb ring 198 mm in diameter to the surfaces of the test pieces, filling the ring with water to a depth of 25.4 mm, and allowing the sample to stand for 24 hours. Sample weights were measured before and after water exposure. Cobb units are calculated using the formula Cobb Unit=(Area Exposed)(Final Wt.—Original Wt.)

Average values for overlaid samples were 14.1 Cobb Units and only 4.5% water pickup. Base panels without the overlay averaged 99.3 Cobb Units and 26.0% water pickup. Moisture had completely penetrated the unoverlaid panels.

Fiber panels overlaid on both sides were also found to have significantly improved dimensional stability when compared with the base panels. A set of samples was conditioned at 50% RH until weight equilibrium was attained and then transferred to a 90% RH environment for a sufficient time to achieve constant weight. "Macosa" base panels showed a linear expansion of 0.36% whereas the overlaid panels were only measured at 0.13%. A similar test on the PresTock overlaid panels showed a linear expansion of about 0.14% compared with 0.18% for the base panels.

Laminates similar to the above were made with wood veneers rather than reconstituted wood fiber cores. Similar improvements in properties were noted, especially in strength across the grain direction.

EXAMPLE 3

In an isocyanate impregnated cellulose sheet, product storage stability for a period of time is virtually essential. It is usually impractical to go directly from the impregnation step to the final process step. Cellulose sheets impregnated with catalyzed isocyanates tend to have poor storage stability. To test the materials of the present invention, southern pine bleached kraft pulp sheets of about 750 g/m² basis weight were impregnated with 10-12% diphenylmethane diisocyanate (MDI) from acetone solution. The MDI is available as Isonate 143L from Dow Chemical Co., Midland, Mich. After evaporation of the solvent the resulting sheets were stored at room temperature and 50% RH for the time indicated. After aging, the treated sheets were pressed for 5 minutes at 177° C. (350° F.) and 5,410 kPa (785 psi). Tensile strength and water absorption after 24 hour immersion were then measured and are shown in Table 3.

TABLE 3

| Aging Time, days | Tensile Strength, kPa $\times 10^4$ | Water Absorbency, % |
| --- | --- | --- |
| 0 | 8.3 | 20 |
| 3 | 8.8 | 18 |
| 10 | 5.0 | 36 |
| Untreated control | 2.3 | 168 |

Stability of the treated samples is good for at least 3 days after impregnation but falls off between 3 and 10 days. This is excellent stability for most potential applications.

EXAMPLE 4

The prior art related to the present invention states the critical need for catalysts with the isocyanate. Further, it teaches the need for long cure times, in the range of about 10 minutes at pressures preferably in the range of about 6,200-11,000 kPa (900-1,600 psi), if satisfactory results are to be achieved. These long and severe cure conditions may in part be a requirement of these earlier inventors' attempts to crosslink the cellulose with the isocyanates. The formation of urethane bonds between isocyanate and cellulose hydroxyls, and a required very low cellulose moisture content; e.g., 1-2%, were seen as necessary to minimize formation of polyureas, regarded as undesirable by earlier British investigators.

The present inventor is not certain about the nature of the reactions taking place in this invention. However, he believes polyurea formation to be quite significant and urethane formation; i.e., reaction with cellulose, to be of lesser degree. Quite surprisingly in view of the adverse comments in the prior art, the present process using uncatalyzed isocyanates has proved to be advantageous in several respects. Required press times are very short, on the order of 1 minute, properties of the resulting products are excellent, and cellulose moisture content is not particularly critical.

Some insight into the nature of the reaction has been obtained using infrared spectroscopy. By following the change in absorbance at 2,276 cm$^{-1}$ over time the disappearance of the isocyanate peak can be followed. Kraft linerboard of 283 g/m² basis weight was impregnated with 10–11% loading of PMDI from acetone solution. Two ply samples were placed in a press at 5,300 kPa (800 psi) and temperatures of 203° C. and 232° C. (400° F. and 450° F.), withdrawn at different times, and the IR spectra recorded. FIG. 1 shows that by 10 seconds the —NCO peaks have nearly disappeared at both temperatures. This rapid reaction is extremely important because it makes continuous pressing a possibility compared with the much more limiting batch pressing.

Figure 2:
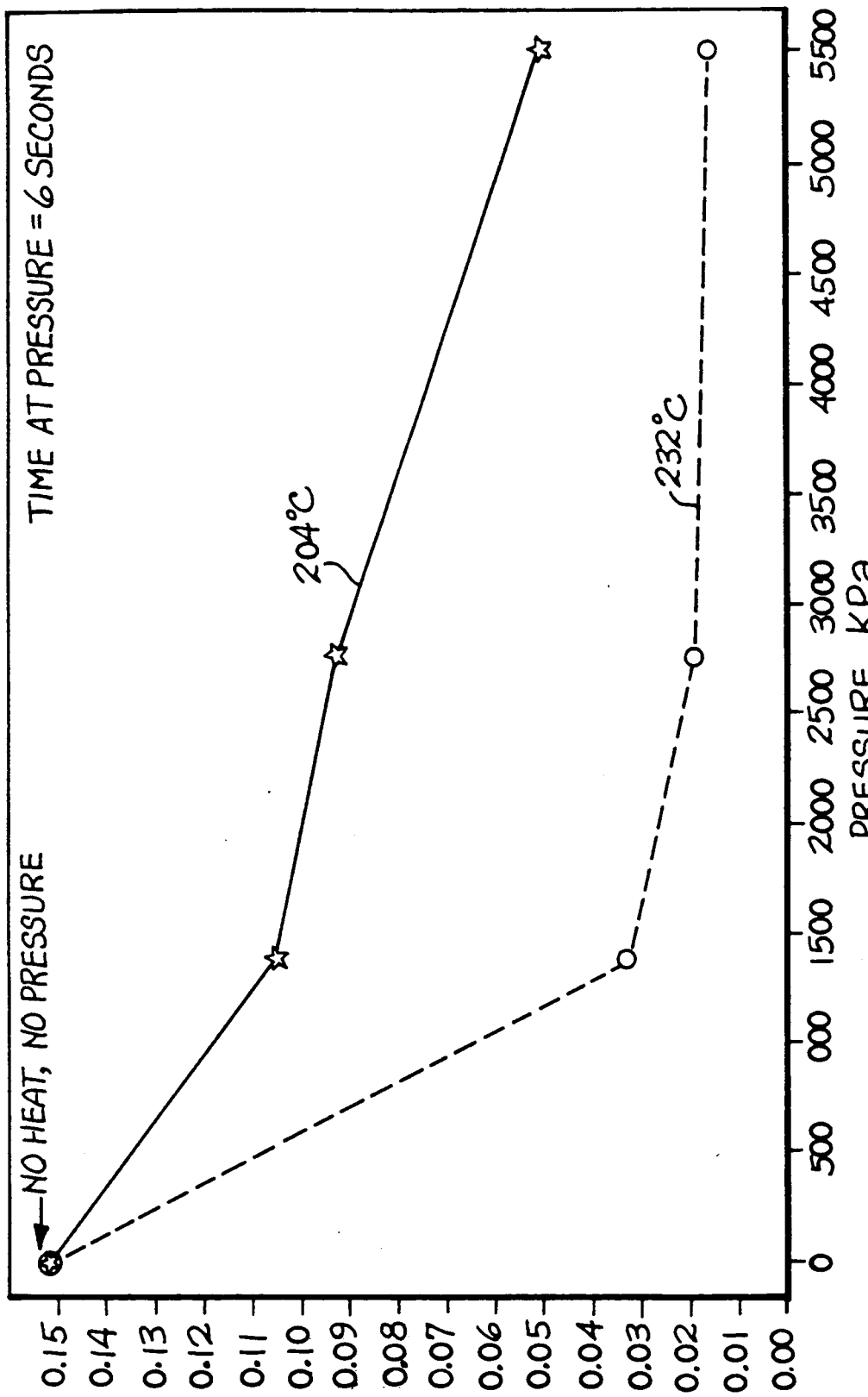
FIG. 2 is a graph similar to FIG. 1 showing dependency of reaction rates on pressure.

It is interesting that the reaction rate, as measured above, appears to be dependent on pressure as well as temperature. Two ply panels, made as just described above, were pressed for 6 seconds at varying pressures. Again, the IR spectra was recorded immediately after the samples were removed from the press. At both temperature levels the —NCO absorbance peak dropped at a significantly slower rate at the lower pressures. This is shown in FIG. 2. The effect does not appear to be a factor of more rapid sheet heat transfer due to higher pressures. Measurements made on single sheets at 204° C. without pressure showed that the sheet interior was essentially up to platen temperature within 30 seconds. Two-thirds of this temperature rise took place in 10 seconds.

EXAMPLE 5

It is generally considered the cellulose sheets impregnated with catalyzed polyisocyanate should be kept as dry as possible, both at and following the time of impregnation. Experience with the present invention using an uncatalyzed isocyanate has shown this concern to the be generally unnecessary. In fact, steaming impregnated sheets immediately prior to pressing has been found to be beneficial.

Kraft linerboard of 283 g/m² basis weight was impregnated with PMDI on both sides, using a roll coater. Pickup was 14% based on dry fiber weight. The impregnated sheets were steamed for various times using dry steam at atmospheric pressure. Five plies were then laid up and the assembly pressed at 204° C. and 2,800 kPa for a total of 66 seconds, which included a breathe cycle. After conditioning, the resulting panels were tested for tensile and flexural strengths. Results of the tests are given in Table 4.

TABLE 4

| Steaming Time, seconds | Tensile Strength, kPa × 10⁵ | Flexural Strength, kPa × 10⁴ |
| --- | --- | --- |
| 0 | 1.31 | 1.19 |
| 10 | 1.33 | 1.45 |
| 30 | 1.34 | 1.18 |
| 60 | 1.08 | 0.94 |

Steaming up to at least 30 seconds does not appear to be harmful and, in fact, may enhance physical properties. It is a very useful technique if the pressed article is to have other than a planar configuration since it enhances plasticity and moldability of the sheets.

In all cases, the as-received moisture content of the kraft linerboard has been found to be eminently suitable and no redrying has been necessary.

EXAMPLE 6

A series of laminates was made under different curing conditions to further show the effects of temperature and pressure. Bleached southern pine kraft pulp sheets of about 750 g/m² basis weight were impregnated with a 10% solution of MDI (Dow Isonate 143L) in acetone. The impregnated sheets were allowed to stand 90 minutes in air to allow the acetone to evaporate. MDI pickup was about 10% based on pulp weight. Flat panels were prepared by stacking three impregnated sheets and pressing for 1 minute under the conditions shown in Table 5.

TABLE 5

| Press Conditions | | Flexural Modulus | Tensile Strength |
| --- | --- | --- | --- |
| Temp. °C. | Pressure kPa | × 10⁶ kPa | × 10⁴ kPa |
| 149 | 2760 | 3.99 | 3.64 |
| 149 | 6,900 | 7.80 | 7.07 |
| 149 | 11,030 | 8.62 | 8.57 |
| 93 | 6,900 | 5.33 | 5.45 |
| 149 | 6,900 | 7.80 | 7.07 |
| 204 | 6,900 | 8.85 | 11.07 |

As pressure and temperature are independently increased, flexural strength and modulus are also increased.

It will be understood by those skilled in the art that many variations and departures from materials and conditions described herein will be within the scope of the invention as long as catalysts are absent or used only at extremely low levels. The invention is to be considered limited only as it is defined in the appended claims.

I claim:

1. A method for making a modified cellulose product which comprises:

impregnating a cellulosic material with an amount of essentially uncatalyzed polyisocyanate within a range of about 8 to 20% by weight of polyisocyanate to cellulosic material; and heating the polyisocyanate-impregnated cellulosic material at a temperature within a range of about 105°–245° C. (221°–473° F.) for a time not exceeding about 5 minutes and at a pressure within a range of about 2700 to 8300 kPa (390 to 1200 psi) so as to cure the polyisocyanate.

2. The method of claim 1 in which the cellulosic material is in a sheet form having first and second sheet surfaces substantially parallel to each other and a Z or thickness dimension extending in a direction between the first and second sheet surfaces perpendicular to the first and second sheet surfaces.

3. The method of claim 2 in which the concentration of polyisocyanate by weight percent relative to the concentration of cellulose is greater at least at one surface of the sheet than in the balance of the Z or thickness dimension of the sheet.

4. The method of claim 3 in which the concentration of polyisocyanate by weight percent relative to the concentration of cellulose is greater at each surface than in a central portion of the material at a location spaced from the surfaces of the material in the Z or thickness dimension of the sheet.

5. The method of claim 2 in which the concentration of polyisocyanate is essentially uniform throughout the Z or thickness dimension of the sheet.

6. The method of claim 1 in which the cellulosic material is selected from the group consisting of chemically purified, kraft, and thermomechanical celluloses.

7. The method of claim 1 in which the polyisocyanate is selected from the group consisting of diphenylmethane diisocyanate, oligomers of diphenylmethane diisocyanate, toluene diisocyanate, 1,6-hexamethylene diisocyanate, and mixtures thereof.

8. The method of claim 7 in which the polyisocyanate is in a blocked form before curing.

9. The method of claim 1 in which the polyisocyanate is impregnated as a concentrate without dilution by a solvent into the cellulosic material.

10. The method of claim 1 in which the polyisocyanate is impregnated as a solution into the cellulosic material.

11. The method of claim 1 in which the cellulosic material has a moisture content not exceeding about 7 percent.

12. The method of claim 1 in which the impregnated cellulosic material is plied on either face of a core material which has not been impregnated with a polyisocyanate.

13. The method of claim 1 in which the core material is selected from wood veneer and reconstituted wood products.

14. The cellulose-based polymeric material of claim 1.

15. A method for making a cellulose-based polymeric material as recited in claim 2 wherein the cellulosic material is a paper material.

16. A method for making a cellulose-based polymeric material as recited in claim 15 wherein the paper material is a kraft paper.

17. A method for making a modified cellulose product which comprises:
impregnating a sheet of cellulosic material selected from the group consisting of kraft and thermomechanical celluloses with an amount of essentially uncatalyzed polyisocyanate selected from the group consisting of diphenylmethane diisocyanate, oligomers of diphenylmethane diisocyanate, and mixtures thereof, within a range of about 8 to 20% by weight of polyisocyanate to cellulosic material; and
heating the polyisocyanate-impregnated cellulosic material at a temperature within a range of about 105° to 245° C. (221° to 473° F.) for a time not exceeding about 2 minutes and at a pressure within a range of about 2700 to 8300 kPa (390 to 1200 psi) so as to cure the polyisocyanate.

18. The cellulose-based polymeric material of claim 17.

19. A method for making a laminated cellulose-based polymeric material comprising the steps:
individually impregnating each of plural sheets of cellulosic material with an essentially uncatalyzed polyisocyanate within a range of about 8 to 20% by weight of polyisocyanate to cellulosic material;
plying at least two of the polyisocyanate-impregnated cellulose sheets together so as to form a stack of said polyisocyanate-impregnated cellulose sheets; and
heating the stack of plied sheets at a temperature in a range of about 105°–245° C. (221°–473° F.) for a time not exceeding about 5 minutes and at a pressure within a range of about 2700 to 8300 kPa (390 to 1200 psi) so as to cure the polyisocyanate.

20. The method of claim 19 in which the cellulosic material is selected from the group consisting of chemically purified, kraft, and thermomechanical celluloses.

21. The method of claim 19 in which the polyisocyanate is selected from the group consisting of diphenylmethane diisocyanate, oligomers of diphenylmethane diisocyanate, toluene diisocyanate, 1,6-hexamethylene diisocyanate, and mixtures thereof.

22. The method of claim 21 in which the polyisocyanate is in a blocked form before curing.

23. The method of claim 19 in which the polyisocyanate is impregnated as a concentrate without dilution by a solvent into the cellulosic material.

24. The method of claim 19 in which the polyisocyanate is impregnated as a solution into the cellulosic material.

25. The method of claim 19 in which the cellulosic material has a moisture content not exceeding about 7 percent by weight.

26. The laminated cellulose-based polymeric material of claim 19.

27. A method for making a laminated cellulose-based polymeric material as recited in claim 19 wherein each sheet of cellulosic material has first and second sheet surfaces extending substantially parallel to each other and having a thickness dimension between the first and second sheet surfaces substantially perpendicular to the first and second sheet surfaces, and wherein there is a greater weight percent of polyisocyanate relative to cellulose at at least one of the first and second sheet surfaces than in the other portions of the laminated material.

28. A method for making a laminated cellulose-based polymeric material as recited in claim 27 wherein the weight percent of polyisocyanate relative to cellulose is greater at the first and second sheet surfaces than at locations along the thickness dimension spaced from the first and second sheet surfaces.

29. A method for making a laminated cellulose-based polymeric material as recited in claim 19 wherein each sheet of cellulosic material has first and second sheet surfaces extending substantially parallel to each other and a thickness dimension between the first and second sheet surfaces substantially perpendicular to the first and second sheet surfaces, and wherein the weight percent of polyisocyanate relative to cellulose is substantially uniform throughout the laminated material.

* * * * *

UNITED STATES PATENT AND TRADEMARK OFFICE
CERTIFICATE OF CORRECTION

PATENT NO. : 5,008,359
DATED : April 16, 1991
INVENTOR(S) : Frank R. Hunter

It is certified that error appears in the above-identified patent and that said Letters Patent is hereby corrected as shown below:

In (57) ABSTRACT, line 4, "polyfunctinal" should read
  --polyfunctional--
In column 5, line 17, "6 sec. to 0 kPa, 6 sec. closing to
  5,520 kPa (800 psi)," should read --6 sec. to 0 kPa,
  6 sec. at 0 kPa, 6 sec. closing to 5,520 kPa (800 psi),--
In column 6, line 56, "this" should read --his--
In column 7, line 34, "the be" should read --be--
In Column 10, line 37, "at at" should read --at--

Signed and Sealed this

Twenty-seventh Day of October, 1992

*Attest:*

DOUGLAS B. COMER

*Attesting Officer*   Acting Commissioner of Patents and Trademarks